Aug. 9, 1932.  E. A. STALKER  1,871,396

MEANS OF REDUCING THE FLUID RESISTANCE OF AUTOMOBILE BODIES

Filed June 8, 1928

INVENTOR

Edward A. Stalker

Patented Aug. 9, 1932

1,871,396

UNITED STATES PATENT OFFICE

EDWARD A. STALKER, OF ANN ARBOR, MICHIGAN

MEANS OF REDUCING THE FLUID RESISTANCE OF AUTOMOBILE BODIES

Application filed June 8, 1928. Serial No. 283,912.

Figure 2:
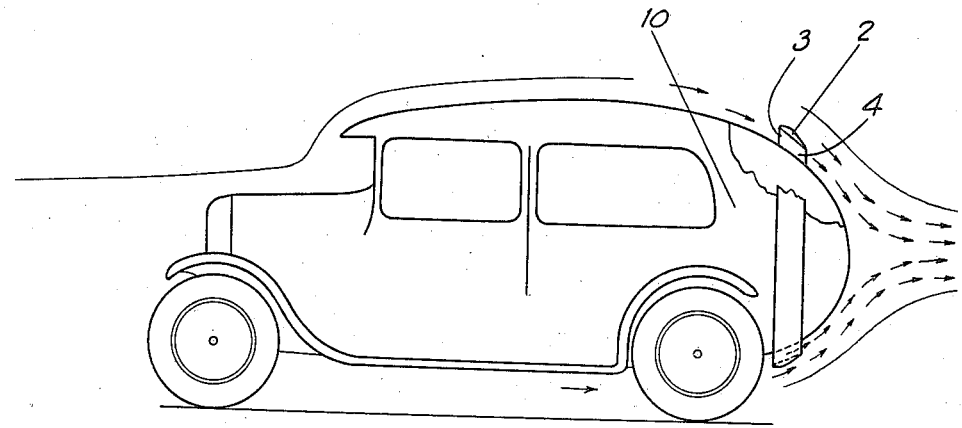
Figure 1:
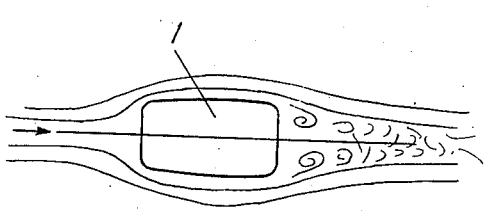
Figure 3:
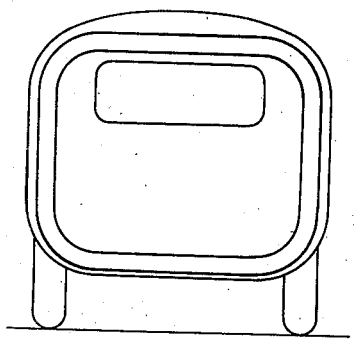

One form of the invention is illustrated in the accompanying drawing. Figure 1 shows the flow behind a blunt body. Figure 2 shows a side view of a body with a portion in section. Figure 3 shows a rear view.

Figure 1 shows the flow behind a body possessing a blunt rear portion where large eddies form. In this region there is a pressure less than atmospheric and this low pressure region accounts for the major portion of the fluid resistance.

The turbulent condition behind the body may be removed and the resistance greatly reduced by compelling the fluid to flow smoothly around the rear portion of the body. This may be accomplished by placing vanes 2 as in Figure 2 to direct the fluid stream into the turbulent region behind the body 10. The vanes are arranged to have a greater opening at 3 than at 4 since it is found to be advantageous to speed up the air being guided into the turbulent region. With the vanes in place the flow becomes smooth and the pressure is nearer atmospheric. Figure 2 shows the smooth flow to the rear.

My claims are:

1. An automobile body comprising a blunt rounded rear end creating air turbulence just to the rear thereof, and vanes provided on opposite sides of the body and spaced outwardly from the body and inclined rearwardly and inwardly so as to direct the air streams inwardly along the rounded rear end to relieve the turbulence just to the rear of the body.

2. An automobile body comprising a blunt rounded rear end creating air turbulence just to the rear thereof, and vanes provided on opposite sides of the body and spaced outwardly from the body so as to direct the air streams inwardly along the rounded rear end to relieve the turbulence just to the rear of the body, said vanes having their front ends spaced further from the adjacent portion of the body than the rear ends are spaced.

In testimony whereof I hereunto affix my signature this 28th day of May, 1928.

EDWARD A. STALKER.